United States Patent
Park (10) Patent No.: US 11,881,722 B2
(45) Date of Patent: Jan. 23, 2024

(54) ELECTRONIC DEVICE INCLUDING WIRELESS CHARGING ANTENNA AND STRUCTURE THEREOF

(71) Applicant: Samsung Electronics Co., Ltd., Suwon-si (KR)

(72) Inventor: Seho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 17/285,899

(22) PCT Filed: Oct. 14, 2019

(86) PCT No.: PCT/KR2019/013444
§ 371 (c)(1),
(2) Date: Apr. 15, 2021

(87) PCT Pub. No.: WO2020/080772
PCT Pub. Date: Apr. 23, 2020

(65) Prior Publication Data
US 2021/0351626 A1  Nov. 11, 2021

(30) Foreign Application Priority Data
Oct. 15, 2018 (KR) .................. 10-2018-0122750

(51) Int. Cl.
*H02J 50/20* (2016.01)
*H02J 50/10* (2016.01)
(Continued)

(52) U.S. Cl.
CPC ............ *H02J 50/20* (2016.02); *H02J 50/005* (2020.01); *H02J 50/10* (2016.02); *H04B 5/0037* (2013.01)

(58) Field of Classification Search
CPC .......... H02J 50/005; H02J 50/10; H02J 50/20; H02J 50/27; H02J 50/80; H04B 5/0037;
(Continued)

(56) References Cited

U.S. PATENT DOCUMENTS 9,077,067 B2    7/2015  Ikemoto
10,103,554 B2  10/2018  Lim et al.
(Continued)

FOREIGN PATENT DOCUMENTS

KR    10-2013-0110397 A    10/2013
KR    10-2014-0011756 A     1/2014
(Continued)

OTHER PUBLICATIONS

International Search Report dated Feb. 14, 2020 in connection with International Patent Application No. PCT/KR2019/013444, 2 pages.
Request for the Submission of an Opinion Feb. 20, 2023, corresponding to Korean Patent Application No. 10-2018-0122750, 15 pages.

*Primary Examiner* — Jeffrey M Shin (57) ABSTRACT

The electronic device comprises: a housing; a wireless charging circuit disposed inside the housing; and a wireless charging antenna electrically connected to the wireless charging circuit and having a spiral shape, wherein the wireless charging antenna comprises: a first conductive pattern corresponding to a region in which current flows toward the inside of the wireless charging antenna from among the regions forming the wireless charging antenna; and a second conductive pattern corresponding to a region in which current flows toward the outside of the wireless charging antenna from among the regions forming the wireless charging antenna, and being disposed on a side of the first conductive pattern on the same plane as and in parallel with the first conductive pattern. The first conductive pattern and the second conductive pattern are formed of a plurality of layers including a first layer and a second layer.

(Continued)

In a first region where a partial region of the first conductive pattern and a partial region of the second conductive pattern cross each other, the first conductive pattern may not include the first layer, and the second conductive pattern may not include the second layer.

14 Claims, 6 Drawing Sheets

(51) Int. Cl.
*H02J 50/00* (2016.01)
*H04B 5/00* (2006.01)

(58) Field of Classification Search
CPC .......... H04B 5/00; H04B 5/0025; H01Q 1/22; H01Q 1/36; H01Q 1/2208
See application file for complete search history.

(56) References Cited

U.S. PATENT DOCUMENTS

| | | |
|---|---|---|
| 10,122,183 B2 | 11/2018 | Lim et al. |
| 10,404,091 B2 | 9/2019 | Chang et al. |
| 2015/0254548 A1 | 9/2015 | Ikemoto |
| 2017/0133152 A1 | 5/2017 | Kouchi et al. |
| 2017/0201114 A1* | 7/2017 | Chang .................. H02J 7/0045 |
| 2017/0207535 A1* | 7/2017 | Tsukuda .................. H01Q 1/24 |

FOREIGN PATENT DOCUMENTS

| | | |
|---|---|---|
| KR | 10-2014-0076222 A | 6/2014 |
| KR | 10-2017-0082916 A | 7/2017 |
| KR | 10-1872399 B1 | 6/2018 |

* cited by examiner

ELECTRONIC DEVICE INCLUDING WIRELESS CHARGING ANTENNA AND STRUCTURE THEREOF

CROSS-REFERENCE TO RELATED APPLICATIONS

This application is a 371 of International Application No. PCT/KR2019/013444 filed on Oct. 14, 2019, which claims priority to Korean Patent Application No. 10-2018-0122750 filed on Oct. 15, 2018, the disclosures of which are herein incorporated by reference in their entirety.

BACKGROUND

1. Field

Embodiments of the disclosure described herein relate to an electronic device including a wireless charging antenna and a structure thereof.

2. Description of Related Art

An electronic device may include a plurality of antennas capable of performing different functions in a wireless environment. For example, the electronic device may include at least one of an antenna configured to perform wireless communication (e.g., cellular communication, short-range wireless communication, or global navigation satellite system (GNSS) communication), an antenna configured to perform a near field communication (NFC) function, an antenna configured to perform a wireless charging function, or an antenna configured to perform a magnetic secure transmission (MST) function.

As an NFC antenna of an external electronic device performing an NFC function with the electronic device is made compact, an NFC antenna included in the electronic device also needs to be made compact. A space may be required for a conductive line of the NFC antenna to pass through a partial area of a wireless charging antenna.

Furthermore, to reduce a difference between magnetic field density in a misalignment state between the electronic device and an external electronic device performing a wireless charging function and magnetic field density in an alignment state, coils forming the wireless charging antenna have to be disposed such that a magnetic field is uniformly generated.

SUMMARY

An electronic device according to an embodiment of the disclosure includes a housing, wireless charging circuitry disposed in the interior of the housing, and a wireless charging antenna that is electrically connected to the wireless charging circuitry and that has a spiral shape. The wireless charging antenna includes a first conductive pattern that corresponds to an area where current spirally flows toward the inside of the wireless charging antenna, among areas forming the wireless charging antenna and a second conductive pattern that corresponds to an area where the current spirally flows toward the outside of the wireless charging antenna, among the areas forming the wireless charging antenna and that is disposed parallel to the first conductive pattern on a side of the first conductive pattern on the same plane. The first conductive pattern and the second conductive pattern are formed of a plurality of layers including a first layer and a second layer. In a first area where part of the first conductive pattern and part of the second conductive pattern intersect each other, the first conductive pattern does not include the first layer, and the second conductive pattern does not include the second layer.

A wireless charging antenna having a spiral shape according to an embodiment of the disclosure includes a first conductive pattern that corresponds to an area where current spirally flows toward the inside of the wireless charging antenna, among areas forming the wireless charging antenna and a second conductive pattern that corresponds to an area where the current spirally flows toward the outside of the wireless charging antenna, among the areas forming the wireless charging antenna and that is disposed parallel to the first conductive pattern on a side of the first conductive pattern on the same plane. The first conductive pattern and the second conductive pattern are formed of a plurality of layers including a first layer and a second layer. In a first area where part of the first conductive pattern and part of the second conductive pattern intersect each other, the first conductive pattern does not include the first layer, and the second conductive pattern does not include the second layer.

An electronic device according to an embodiment of the disclosure includes a housing, wireless charging circuitry disposed in the interior of the housing, a wireless charging antenna that is electrically connected to the wireless charging circuitry and that has a spiral shape, wireless communication circuitry that performs a near field communication (NFC) function, and an NFC antenna electrically connected to the wireless communication circuitry. The wireless charging antenna includes a first conductive pattern that corresponds to an area where current spirally flows toward the inside of the wireless charging antenna, among areas forming the wireless charging antenna and a second conductive pattern that corresponds to an area where the current spirally flows toward the outside of the wireless charging antenna, among the areas forming the wireless charging antenna and that is disposed parallel to the first conductive pattern on a side of the first conductive pattern on the same plane. The wireless charging antenna includes a first area where part of the first conductive pattern and part of the second conductive pattern intersect each other, and the NFC antenna is disposed in the interior of the wireless charging antenna. A maximum horizontal length of the NFC antenna is smaller than a minimum horizontal length of the wireless charging antenna, and a maximum vertical length of the NFC antenna is smaller than a minimum vertical length of the wireless charging antenna.

According to the embodiments of the disclosure, the electronic device includes the NFC antenna in the interior of the wireless charging antenna having a spiral shape. Accordingly, the electronic device may provide compatibility with another external electronic device (e.g., an NFC tag) including a compact NFC antenna.

According to the embodiments of the disclosure, coils of the wireless charging antenna included in the electronic device form a lateral structure having an intersection area (or, an intersection point), thereby uniformly generating a magnetic field.

In addition, the disclosure may provide various effects that are directly or indirectly recognized.

BRIEF DESCRIPTION OF THE DRAWINGS

With regard to description of the drawings, identical or similar reference numerals may be used to refer to identical or similar components.

DETAILED DESCRIPTION

Hereinafter, various embodiments of the disclosure will be described with reference to the accompanying drawings. However, this is not intended to limit the disclosure to specific embodiments, and it should be understood that the disclosure includes various modifications, equivalents, and/or alternatives of the embodiments of the disclosure.

Figure 1:
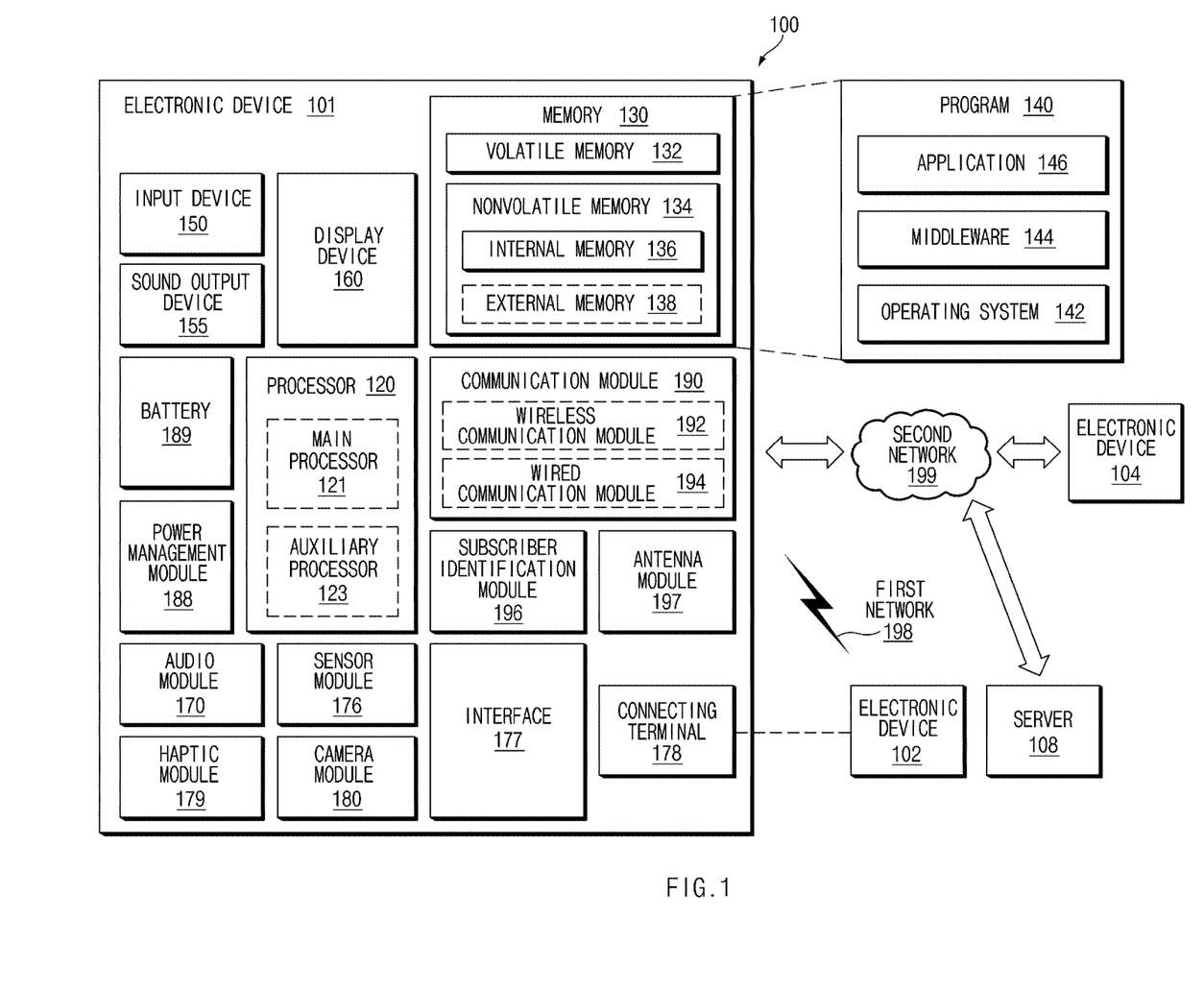
FIG. 1 illustrates a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected to the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
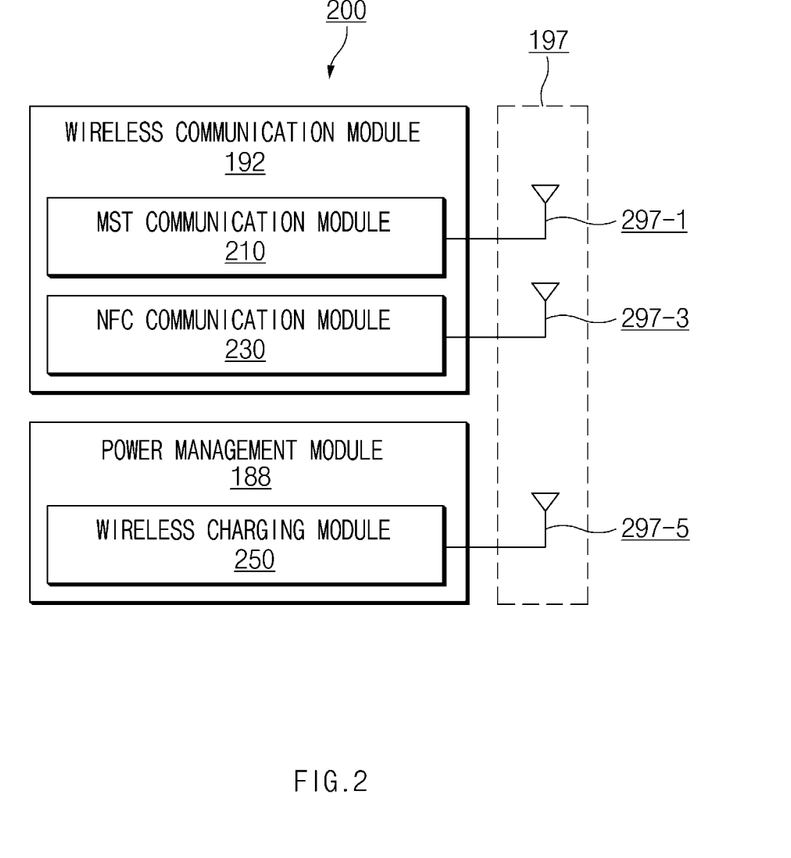
FIG. 2 is a block diagram illustrating a wireless communication module, a power management module, and an antenna module of the electronic device according to various embodiments.

FIG. 2 is a block diagram 200 illustrating the wireless communication module 192, the power management module 188, and the antenna module 197 of the electronic device 101 according to various embodiments.

Referring to FIG. 2, the wireless communication module 192 may include an MST communication module 210 or an NFC communication module 230, and the power management module 188 may include a wireless charging module 250. In this case, the antenna module 297 may include a plurality of antennas including an MST antenna 297-1 connected to the MST communication module 210, an NFC antenna 297-3 connected to the NFC communication module 230, and a wireless charging antenna 297-5 connected to the wireless charging module 250. For convenience of description, the same components as those described above with reference to FIG. 1 will be omitted from the description or will be briefly described.

The MST communication module 210 may receive a signal including control information or payment information such as card information from the processor 120, may generate a magnetic signal corresponding to the received signal through the MST antenna 297-1, and may transmit the generated magnetic signal to the external electronic device 102 (e.g., a POS device). According to an embodiment, to generate the magnetic signal, the MST communication module 210 may include a switching module (not illustrated) that includes one or more switches connected to the MST antenna 297-1 and may control the switching module to change the direction of voltage or current supplied to the MST antenna 297-1, depending on the received signal. The change of the direction of the voltage or current enables the direction of the magnetic signal (e.g., a magnetic field) transmitted through the MST antenna 297-1 to be changed accordingly. When detected by the external electronic device 102, the magnetic signal, the direction of which is changed, may cause an effect (e.g., a wave form) similar to a magnetic field generated while a magnetic card corresponding to the received signal (e.g., card information) is swiped through a card reader of the electronic device 102. According to an embodiment, payment-related information and a control signal received in the form of the magnetic signal by the electronic device 102 may be, for example, transmitted to the external server 108 (e.g., a payment server) through the second network 199.

The NFC communication module 230 may obtain a signal including control information or payment information such as card information from the processor 120 and may transmit the obtained signal to the external electronic device 102 through the NFC antenna 297-3. According to an embodiment, the NFC communication module 230 may receive, through the NFC antenna 297-3, a signal transmitted from the external electronic device 102.

The wireless charging module 250 may wirelessly transmit electric power to the external electronic device 102 (e.g., a mobile phone or a wearable device) through the wireless charging antenna 297-5, or may wirelessly receive electric power from the external electronic device 102 (e.g., a wireless charging device). The wireless charging module 250 may support, for example, one or more of various wireless charging methods including a magnetic resonance method or a magnetic induction method.

According to an embodiment, some of the MST antenna 297-1, the NFC antenna 297-3, or the wireless charging antenna 297-5 may share at least part of a radiator with one another. For example, a radiator of the MST antenna 297-1 may be used as a radiator of the NFC antenna 297-3 or the wireless charging antenna 297-5, and vice versa. In this case, the antenna module 297 may include switching circuitry (not illustrated) configured to selectively connect (e.g., close) or separate (e.g., open) at least some of the antennas 297-1, 297-3, or 297-3 under the control of the wireless communication module 192 (e.g., the MST communication module 210 or the NFC communication module 230) or the power management module 188 (e.g., the wireless charging module 250). For example, when the electronic device 101 uses a wireless charging function, the NFC communication module 230 or the wireless charging module 250 may control the switching circuitry to temporarily separate at least part of a radiator shared by the NFC antenna 297-3 and the wireless charging antenna 297-5 from the NFC antenna 297-3 and connect the at least part of the radiator with the wireless charging antenna 297-5.

According to an embodiment, at least one function of the MST communication module 210, the NFC communication module 230, or the wireless charging module 250 may be controlled by an external processor (e.g., the processor 120). According to an embodiment, specified functions (e.g., payment functions) of the MST communication module 210 or the NFC communication module 230 may be performed in a trusted execution environment (TEE). The trusted execution environment (TEE) according to various embodiments may form, for example, an execution environment in which at least specified part of the memory 130 is allocated to be used to perform a function (e.g., financial transaction or a function related to personal information) that requires a relatively high level of security. In this case, access to the specified part may be restrictively allowed, for example, depending on a subject that accesses the specified part or an application executed in the trusted execution environment.

Figure 3A:
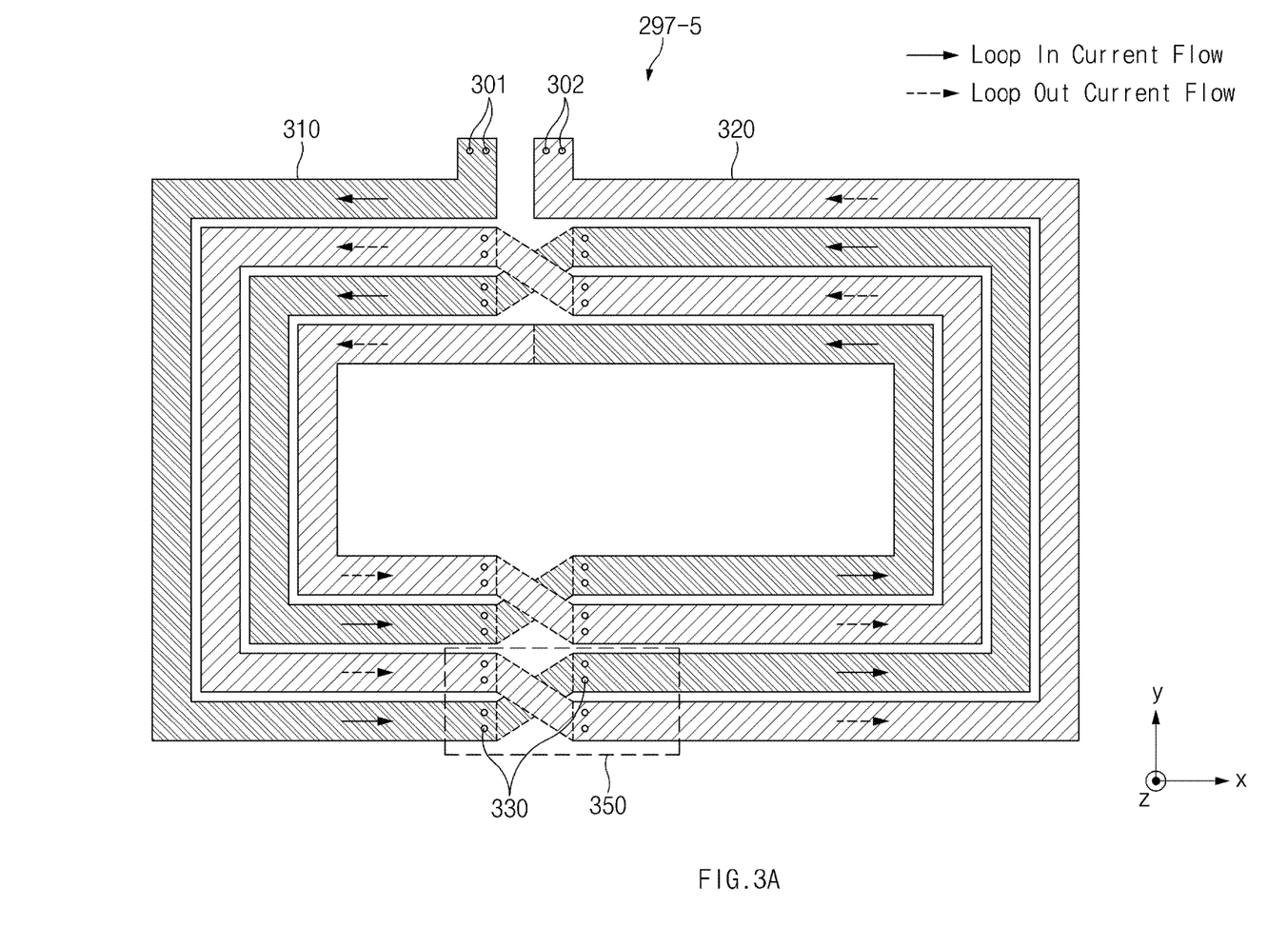
FIG. 3A illustrates a structure of a wireless charging antenna according to various embodiments.
Figure 3B:
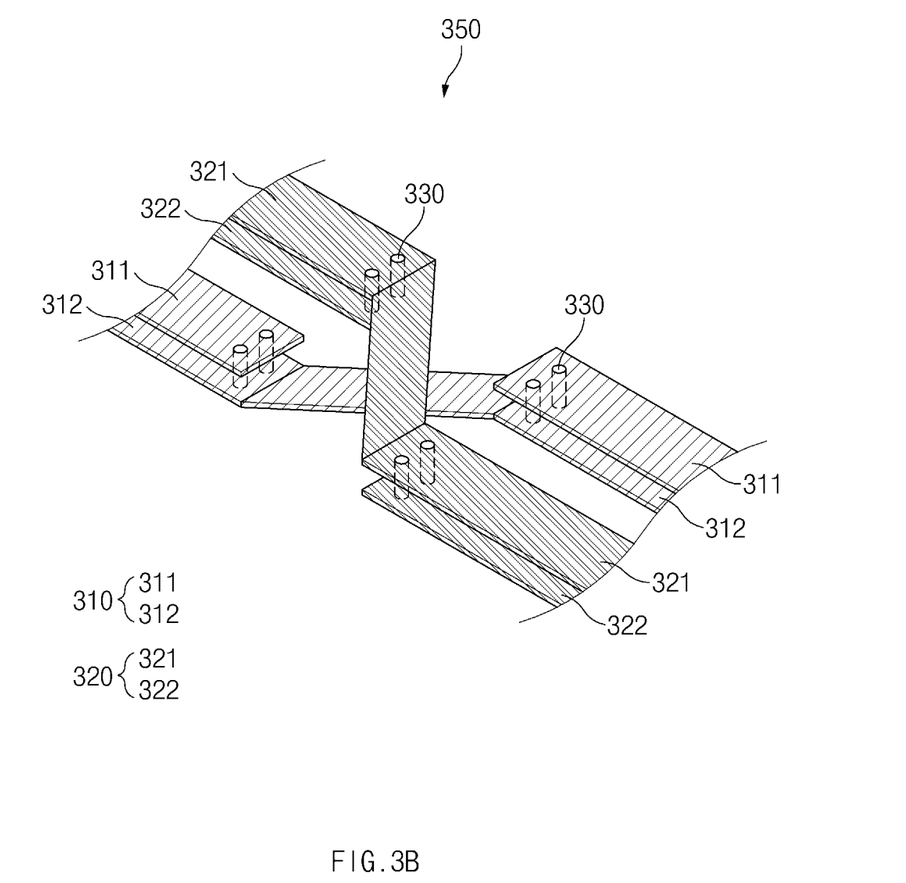
FIG. 3B is a view illustrating an intersection area in the wireless charging antenna according to various embodiments.

FIGS. 3A and 3B illustrate a structure of the wireless charging antenna 297-5 according to various embodiments. FIG. 3A illustrates the structure of the wireless charging antenna 297-5 when viewed in an x-y plane, and FIG. 3B is an enlarged view of a first area 350 where a first conductive pattern 310 and a second conductive pattern 320 intersect each other.

Referring to FIG. 3A, the wireless charging antenna 297-5 may be referred to as a wireless power coil (WPC). The wireless charging antenna 297-5 may have a spiral shape. A first portion 301 of the wireless charging antenna 297-5 and a second portion 302 different from the first portion may be electrically connected to wireless charging circuitry (e.g., at least part of the wireless charging module 250 of FIG. 2).

Current introduced into the first portion 301 may spirally flow toward the inside of the spiral structure of the wireless charging antenna 297-5. The current spirally flowing inward may exit through the second portion 302 after spirally flowing toward the outside of the spiral structure. In the disclosure, among areas forming the wireless charging antenna 297-5, the area through which the current spirally flows inward may be referred to as the first conductive pattern 310. Furthermore, among the areas forming the wireless charging antenna 297-5, the area through which the current spirally flows outward may be referred to as the second conductive pattern 320. Because the current spirally flows inward through the first conductive pattern 310 and thereafter spirally flows outward through the second conductive pattern 320, the wireless charging antenna 297-5 has an effect that distribution of magnetic field density is uniformly generated in a process in which the wireless charging antenna 297-5 is coupled with an antenna of an external electronic device. When the magnetic field density is uniformly generated, a variation in the magnetic field density may be minimized even though misalignment occurs between the electronic device 101 and the external electronic device.

According to an embodiment, the first conductive pattern 310 and the second conductive pattern 320 may form a lateral structure. For example, the second conductive pattern 320 may be disposed substantially parallel to the first conductive pattern 310 in the same layer as the first conductive pattern 310 (or, on a side of the first conductive pattern 310). When the first conductive pattern 310 and the second conductive pattern 320 form the lateral structure, parasitic capacitance may be decreased, as compared with when the first conductive pattern 310 and the second conductive pattern 320 are formed by stacking two or more layers.

According to an embodiment, the wireless charging antenna 297-5 may include an intersection structure to allow the first conductive pattern 310 and the second conductive pattern 320 to form the lateral structure. For example, at least part of the first conductive pattern 310 and at least part of the second conductive pattern 320 may intersect each other in the first area 350. According to an embodiment, the first conductive pattern 310 and the second conductive pattern 320 may include via-holes (e.g., 330) in an intersection area (e.g., 350).

Referring to FIG. 3B, the wireless charging antenna 297-5 may include wiring members (e.g., conductive materials) that form a plurality of layers. For example, the wireless charging antenna 297-5 may include first conductive materials (e.g., 311 and 321) disposed in a first layer (e.g., +z-axis direction in FIG. 3A) among the plurality of layers and second conductive materials (e.g., 312 and 322) disposed in a second layer (e.g., −z-axis direction in FIG. 3A) that is different from the first layer. Although not illustrated in FIG. 3B, an insulating material may be disposed between the first layer and the second layer. The conductive materials (e.g., 311 and 321) disposed in the first layer and the conductive materials (e.g., 312 and 322) disposed in the second layer may have the same shape and may be electrically connected in parallel by being connected through the via-holes 330 in the first area 350.

According to an embodiment, at an intersection point in the first area 350, the first conductive pattern 310 and the second conductive pattern 320 may not include one of the plurality of conductive materials (or, a part of the plurality of layers) because a short may occur due to physical contact between conductive materials disposed in the same layer. For example, the first conductive pattern 310 may not include the first conductive material 311 disposed in the first layer, and the second conductive pattern 320 may not include the second conductive material 322 disposed in the second layer. In this case, in the first area 350, current may flow only through the second conductive material 312 of the first conductive pattern 310 and the first conductive material 321 of the second conductive pattern 320. In the first area 350, the first conductive pattern 310 may include the via-holes 330 connecting the first conductive material 311 and the second conductive material 312, and the second conductive pattern 320 may include the via-holes 330 connecting the first conductive material 321 and the second conductive material 322. The number of via-holes 330 is not limited to the example illustrated in FIG. 3B.

Although not illustrated in FIG. 3B, according to another embodiment, in the first area 350, the first conductive pattern 310 may not include the second conductive material 312, and the second conductive pattern 320 may not include the first conductive material 321. In this case, in the first area 350, current may flow only through the first conductive material 311 of the first conductive pattern 310 and the second conductive material 322 of the second conductive pattern 320.

Figure 4A:
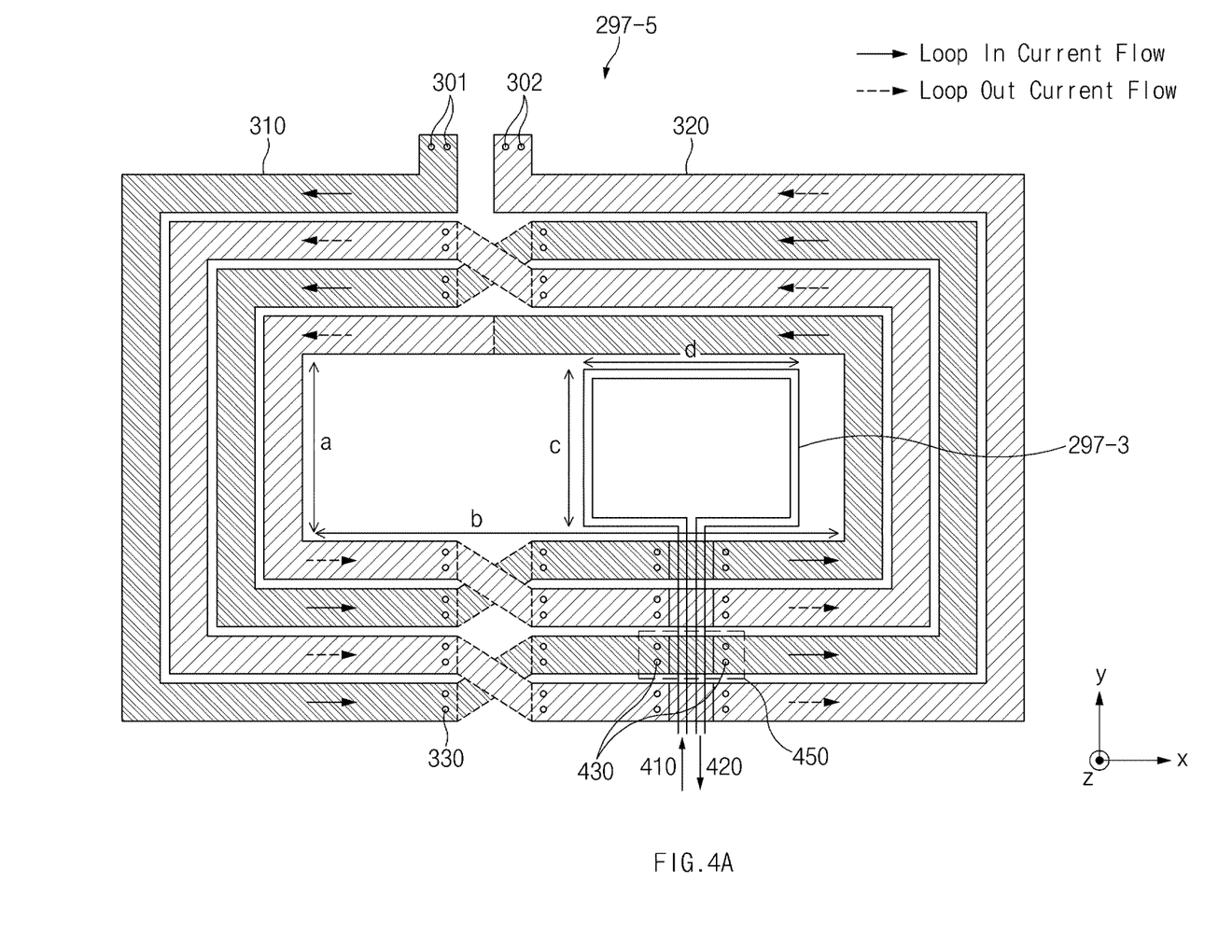
FIG. 4A illustrates a structure of the wireless charging antenna having an NFC antenna disposed therein according to various embodiments.
Figure 4B:
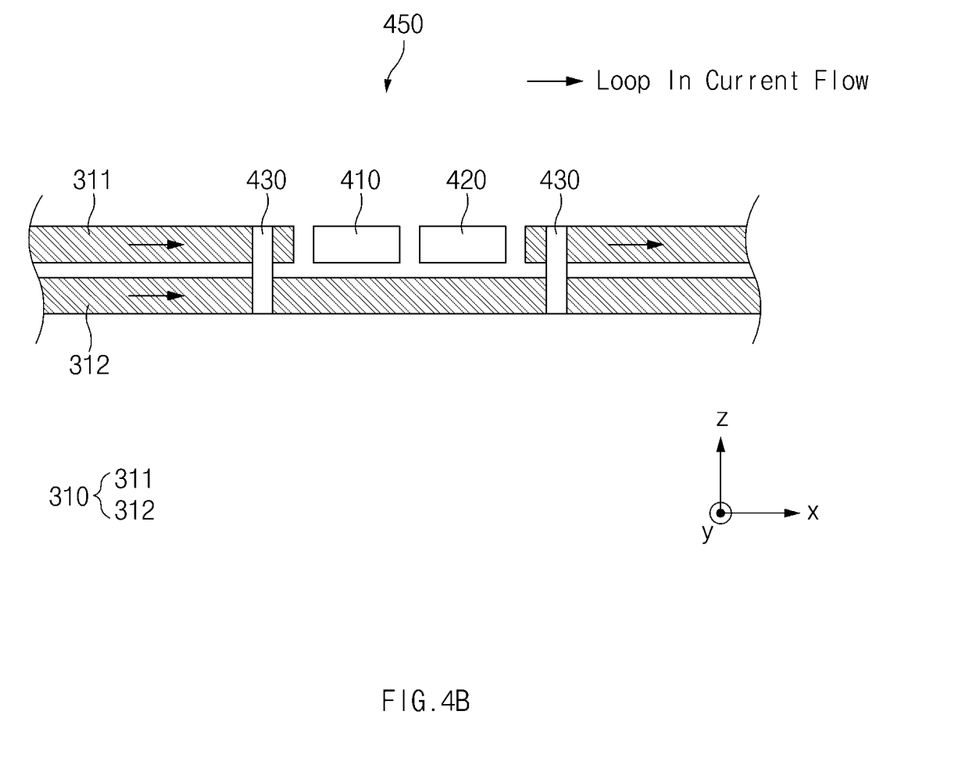
FIG. 4B is a view illustrating an area through which the NFC antenna passes in the wireless charging antenna according to various embodiments.

FIGS. 4A and 4B illustrate a structure of the wireless charging antenna 297-5 having the NFC antenna 297-3 disposed therein according to various embodiments. FIG. 4A illustrates the structure of the wireless charging antenna 297-5 when viewed in an x-y plane, and FIG. 4B is an enlarged view of a second area 450 through which conductive lines 410 and 420 of the NFC antenna 297-3 pass, among the areas forming the wireless charging antenna 297-5.

Referring to FIG. 4A, the electronic device 101 may include the NFC antenna 297-3 made compact. When the NFC antenna 297-3 is made compact, the electronic device 101 may stably perform an NFC function with a small external electronic device (e.g., an NFC tag or a wearable device). According to an embodiment, the NFC antenna 297-3 may be disposed in the interior of the wireless charging antenna 297-5, and to increase coupling efficiency between the NFC antenna and another external electronic device including a compact NFC antenna, the area of the NFC antenna 297-3 may be smaller than the internal area of the wireless charging antenna 297-5. For example, the maximum vertical length "c" of the NFC antenna 297-3 may be smaller than the minimum vertical length "a" of the wireless charging antenna 297-5, and the maximum horizontal length "d" of the NFC antenna 297-3 may be smaller than the minimum horizontal length "b" of the wireless charging antenna 297-5. In another example, although not illustrated in FIG. 4A, the maximum diameter of the NFC antenna 297-3 may be smaller than the minimum diameter of the wireless charging antenna 297-5 when the wireless charging antenna 297-5 and the NFC antenna 297-3 have a circular shape.

According to an embodiment, to allow the conductive lines 410 and 420 for transferring current to the NFC antenna 297-3 to pass, the first conductive pattern 310 and the second conductive pattern 320 may include via-holes 430 in at least a partial area (e.g., the second area 450) of the wireless charging antenna 297-5 through which the conductive lines 410 and 420 pass.

According to an embodiment, as illustrated in FIG. 3A, the NFC antenna 297-3 may form a lateral structure. For example, when the NFC antenna 297-3 has a spiral shape, the NFC antenna 297-3 may include a third conductive pattern corresponding to an area where current spirally flows toward the inside of the NFC antenna 297-3 and a fourth conductive pattern corresponding to an area where the current spirally flows toward the outside of the NFC antenna 297-3. The fourth conductive pattern may be disposed parallel to the third conductive pattern on the same plane. To form the lateral structure, part of the third conductive pattern and part of the fourth conductive pattern may intersect each other.

According to an embodiment, as illustrated in FIG. 3B, the NFC antenna 297-3 may include a plurality of layers. For example, the NFC antenna 297-3 may include a third layer and a fourth layer. In an area where the third conductive pattern and the fourth conductive pattern intersect each other, the third conductive pattern may not include the third layer, and the fourth conductive pattern may not include the fourth layer. The NFC antenna 297-3 may include at least one via-hole that connects an omitted layer (e.g., the third layer of the third conductive pattern) and another layer (e.g., the fourth layer of the third conductive pattern).

Referring to FIG. 4B, in the second area 450, the first conductive pattern 310 may not include the first conductive material 311 to allow the conductive lines 410 and 420 to pass. In the second area 450, the first conductive pattern 310 may include the via-holes 430 that connect the first conductive material 311 and the second conductive material 312. The number of via-holes 430 is not limited to the example illustrated in FIG. 4B.

Although FIG. 4B illustrates only the first conductive pattern 310, the same principle may be applied to the second conductive pattern 320. For example, in the second area 450, the second conductive pattern 320 may not include the first conductive material (e.g., 321 of FIG. 3B) and may include via-holes that connect the first conductive material and the second conductive material (e.g., 322 of FIG. 3B).

As described above, an electronic device (e.g., 101 of FIG. 1) may include a housing (not illustrated), wireless charging circuitry (at least part of 250 of FIG. 2) that is disposed in the interior of the housing, and a wireless charging antenna (e.g., 297-5 of FIG. 3A) that is electrically connected to the wireless charging circuitry and that has a spiral shape. The wireless charging antenna may include a first conductive pattern (e.g., 310 of FIG. 3A) that corresponds to an area where current spirally flows toward the inside of the wireless charging antenna, among areas forming the wireless charging antenna and a second conductive pattern (e.g., 320 of FIG. 3A) that corresponds to an area where the current spirally flows toward the outside of the wireless charging antenna, among the areas forming the wireless charging antenna and that is disposed parallel to the first conductive pattern on a side of the first conductive pattern on the same plane. The first conductive pattern and the second conductive pattern may be formed of a plurality of layers including a first layer and a second layer. In a first area (e.g., 350 of FIG. 3A) where part of the first conductive pattern and part of the second conductive pattern intersect each other, the first conductive pattern may not include the first layer (e.g., 311 of FIG. 3B), and the second conductive pattern may not include the second layer (e.g., 322 of FIG. 3B).

According to an embodiment, the wireless charging antenna may include, in at least part of the first area, at least one via-hole (e.g., 330 of FIG. 3A) that connects the first layer and the second layer.

According to an embodiment, the electronic device may further include wireless communication circuitry (e.g., at least part of 192 of FIG. 2) that performs a near field communication (NFC) function and an NFC antenna (e.g., 297-3 of FIG. 2) electrically connected to the wireless communication circuitry. The NFC antenna may be disposed in the interior of the wireless charging antenna. A maximum horizontal length of the NFC antenna may be smaller than a minimum horizontal length of the wireless charging antenna, and a maximum vertical length of the NFC antenna may be smaller than a minimum vertical length of the wireless charging antenna.

According to an embodiment, a second area (e.g., 450 of FIG. 4A), among the first conductive pattern and the second conductive pattern, where a conductive line which connects the NFC antenna and the wireless communication circuitry passes through may not include the first layer (e.g., 311 of FIG. 4B).

According to an embodiment, the wireless charging antenna may include, in at least part of the second area, at least one via-hole (e.g., 430 of FIG. 4A) that connects the first layer and the second layer.

According to an embodiment, the NFC antenna may include a third conductive pattern that corresponds to an area where current spirally flows toward the inside of the NFC antenna, among areas forming the NFC antenna and a fourth conductive pattern that corresponds to an area where the current spirally flows toward the outside of the NFC antenna, among the areas forming the NFC antenna and that is disposed parallel to the third conductive pattern on a side of the third conductive pattern on the same plane. The third conductive pattern and the fourth conductive pattern may be formed of a plurality of layers including a third layer and a fourth layer. In a third area where part of the third conductive pattern and part of the fourth conductive pattern intersect each other, the third conductive pattern may not include the third layer, and the fourth conductive pattern may not include the fourth layer.

According to an embodiment, the wireless charging antenna may include a wireless power coil (WPC).

As described above, a wireless charging antenna (e.g., 297-5 of FIG. 3A) having a spiral shape may include a first conductive pattern (e.g., 310 of FIG. 3A) that corresponds to an area where current spirally flows toward the inside of the wireless charging antenna, among areas forming the wireless charging antenna and a second conductive pattern (e.g., 320 of FIG. 3A) that corresponds to an area where the current spirally flows toward the outside of the wireless charging antenna, among the areas forming the wireless charging antenna and that is disposed parallel to the first conductive pattern on a side of the first conductive pattern on the same plane. The first conductive pattern and the second conductive pattern may be formed of a plurality of layers including a first layer and a second layer. In a first area (e.g., 350 of FIG. 3A) where part of the first conductive pattern and part of the second conductive pattern intersect each other, the first conductive pattern may not include the first layer (e.g., 311 of FIG. 3B), and the second conductive pattern may not include the second layer (e.g., 322 of FIG. 3B).

According to an embodiment, the wireless charging antenna may further include, in at least part of the first area, at least one via-hole (e.g., 330 of FIG. 3A) that connects the first layer and the second layer.

According to an embodiment, the wireless charging antenna may further include, in the interior of the wireless charging antenna, a space in which a near field communication (NFC) antenna (e.g., 297-3 of FIG. 2) is disposed. A maximum horizontal length of the NFC antenna may be smaller than a minimum horizontal length of the wireless charging antenna, and a maximum vertical length of the NFC antenna may be smaller than a minimum vertical length of the wireless charging antenna.

According to an embodiment, a second area (e.g., 450 of FIG. 4A), among the first conductive pattern and the second conductive pattern, where a conductive line which connects the NFC antenna and the wireless communication circuitry passes through may not include the first layer (e.g., 311 of FIG. 4B).

According to an embodiment, the wireless charging antenna may include, in at least part of the second area, at least one via-hole (e.g., 430 of FIG. 4A) that connects the first layer and the second layer.

According to an embodiment, the NFC antenna may include a third conductive pattern that corresponds to an area where current spirally flows toward the inside of the NFC antenna, among areas forming the NFC antenna and a fourth conductive pattern that corresponds to an area where the current spirally flows toward the outside of the NFC antenna, among the areas forming the NFC antenna and that is disposed parallel to the third conductive pattern on a side of the third conductive pattern on the same plane. The third conductive pattern and the fourth conductive pattern may be formed of a plurality of layers including a third layer and a fourth layer. In a third area where part of the third conductive pattern and part of the fourth conductive pattern intersect each other, the third conductive pattern may not include the third layer, and the fourth conductive pattern may not include the fourth layer.

According to an embodiment, the wireless charging antenna may include a wireless power coil (WPC).

As described above, an electronic device (e.g., 101 of FIG. 1) may include a housing, wireless charging circuitry (e.g., at least part of 250 of FIG. 2) that is disposed in the interior of the housing, a wireless charging antenna (e.g., 297-5 of FIG. 3A) that is electrically connected to the wireless charging circuitry and that has a spiral shape, wireless communication circuitry (e.g., at least part of 192 of FIG. 2) that performs a near field communication (NFC) function, and an NFC antenna (e.g., 297-3 of FIG. 2) that is electrically connected to the wireless communication circuitry. The wireless charging antenna may include a first conductive pattern (e.g., 310 of FIG. 3A) that corresponds to an area where current spirally flows toward the inside of the wireless charging antenna, among areas forming the wireless charging antenna and a second conductive pattern (e.g., 320 of FIG. 3A) that corresponds to an area where the current spirally flows toward the outside of the wireless charging antenna, among the areas forming the wireless charging antenna and that is disposed parallel to the first conductive pattern on a side of the first conductive pattern on the same plane. The wireless charging antenna may include a first area (e.g., 350 of FIG. 3A) where part of the first conductive pattern and part of the second conductive pattern intersect each other, and the NFC antenna may be disposed in the interior of the wireless charging antenna. A maximum horizontal length of the NFC antenna may be smaller than a minimum horizontal length of the wireless charging antenna, and a maximum vertical length of the NFC antenna may be smaller than a minimum vertical length of the wireless charging antenna.

According to an embodiment, the first conductive pattern and the second conductive pattern may be formed of a plurality of layers including a first layer and a second layer. In the first area where the part of the first conductive pattern and the part of the second conductive pattern intersect each other, the first conductive pattern may not include the first layer, and the second conductive pattern may not include the second layer.

According to an embodiment, the wireless charging antenna may include, in at least part of the first area, at least one via-hole that connects the first layer and the second layer.

According to an embodiment, the wireless charging antenna may be configured such that a second area, among the first conductive pattern and the second conductive pattern, where a conductive line which connects the NFC antenna and the wireless communication circuitry passes through is configured to not include the first layer.

According to an embodiment, the wireless charging antenna may include, in at least part of the second area, at least one via-hole that connects the first layer and the second layer.

According to an embodiment, the NFC antenna may include a third conductive pattern corresponding to an area where current spirally flows toward the inside of the NFC antenna, among areas forming the NFC antenna and a fourth conductive pattern that corresponds to an area where the current spirally flows toward the outside of the NFC antenna, among the areas forming the NFC antenna and that is disposed parallel to the third conductive pattern on a side of the third conductive pattern on the same plane. The third conductive pattern and the fourth conductive pattern may be formed of a plurality of layers including a third layer and a fourth layer. In a third area where part of the third conductive pattern and part of the fourth conductive pattern intersect each other, the third conductive pattern may not include the third layer, and the fourth conductive pattern may not include the fourth layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected to", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
wireless charging circuitry disposed in the interior of the housing; and
a wireless charging antenna having a spiral shape and electrically connected to the wireless charging circuitry,
wherein the wireless charging antenna includes:
a first conductive pattern corresponding to an area where current spirally flows toward the inside of the wireless charging antenna, among areas configured to form the wireless charging antenna; and
a second conductive pattern corresponding to an area where the current spirally flows toward the outside of the wireless charging antenna, among the areas configured to form the wireless charging antenna, wherein the second conductive pattern is disposed parallel to the first conductive pattern on a side of the first conductive pattern on the same plane,
wherein the first conductive pattern and the second conductive pattern are formed of a plurality of layers including a first layer and a second layer, and
wherein in a first area where part of the first conductive pattern and part of the second conductive pattern intersect each other, the first conductive pattern does not include the first layer, and the second conductive pattern does not include the second layer.

2. The electronic device of claim 1, wherein the wireless charging antenna includes at least one via-hole configured to connect the first layer and the second layer in at least part of the first area.

3. The electronic device of claim 2, further comprising:
wireless communication circuitry configured to perform a near field communication (NFC) function; and
an NFC antenna electrically connected to the wireless communication circuitry,
wherein the NFC antenna is disposed in the interior of the wireless charging antenna,
wherein a maximum horizontal length of the NFC antenna is smaller than a minimum horizontal length of the wireless charging antenna, and
wherein a maximum vertical length of the NFC antenna is smaller than a minimum vertical length of the wireless charging antenna.

4. The electronic device of claim 3, wherein a second area, among the first conductive pattern and the second conductive pattern, where a conductive line passes through is configured to not include the first layer, wherein the conductive line connects the NFC antenna and the wireless communication circuitry.

5. The electronic device of claim 4, wherein the wireless charging antenna includes at least one via-hole configured to connect the first layer and the second layer in at least part of the second area.

6. The electronic device of claim 3, wherein the NFC antenna includes:
a third conductive pattern corresponding to an area where current spirally flows toward the inside of the NFC antenna, among areas configured to form the NFC antenna; and
a fourth conductive pattern corresponding to an area where the current spirally flows toward the outside of the NFC antenna, among the areas configured to form the NFC antenna, wherein the fourth conductive pattern is disposed parallel to the third conductive pattern on a side of the third conductive pattern on the same plane,
wherein the third conductive pattern and the fourth conductive pattern are formed of a plurality of layers including a third layer and a fourth layer, and
wherein in a third area where part of the third conductive pattern and part of the fourth conductive pattern intersect each other, the third conductive pattern does not include the third layer, and the fourth conductive pattern does not include the fourth layer.

7. The electronic device of claim 1, wherein the wireless charging antenna includes a wireless power coil (WPC).

8. A wireless charging antenna having a spiral shape, the wireless charging antenna comprising:
a first conductive pattern corresponding to an area where current spirally flows toward the inside of the wireless charging antenna, among areas configured to form the wireless charging antenna; and
a second conductive pattern corresponding to an area where the current spirally flows toward the outside of the wireless charging antenna, among the areas configured to form the wireless charging antenna, wherein the second conductive pattern is disposed substantially parallel to the first conductive pattern on a side of the first conductive pattern on the same plane, wherein the first conductive pattern and the second conductive pattern are formed of a plurality of layers including a first layer and a second layer, and wherein in a first area where part of the first conductive pattern and part of the second conductive pattern intersect each other, the first conductive pattern does not include the first layer, and the second conductive pattern does not include the second layer.

9. The wireless charging antenna of claim 8, wherein the wireless charging antenna further comprises at least one via-hole configured to connect the first layer and the second layer in at least part of the first area.

10. The wireless charging antenna of claim 9, wherein the wireless charging antenna further comprises, in the interior of the wireless charging antenna, a space in which a near field communication (NFC) antenna is disposed, wherein a maximum horizontal length of the NFC antenna is smaller than a minimum horizontal length of the wireless charging antenna, and wherein a maximum vertical length of the NFC antenna is smaller than a minimum vertical length of the wireless charging antenna.

11. The wireless charging antenna of claim 10, further comprising:

wireless communication circuitry configured to perform a near field communication (NFC) function, wherein a second area, among the first conductive pattern and the second conductive pattern, where a conductive line passes through is configured to not include the first layer, wherein the conductive line connects the NFC antenna and the wireless communication circuitry.

12. The wireless charging antenna of claim 11, wherein the wireless charging antenna comprises at least one via-hole configured to connect the first layer and the second layer in at least part of the second area.

13. The wireless charging antenna of claim 12, wherein the NFC antenna includes:

a third conductive pattern corresponding to an area where current spirally flows toward the inside of the NFC antenna, among areas configured to form the NFC antenna; and a fourth conductive pattern corresponding to an area where the current spirally flows toward the outside of the NFC antenna, among the areas configured to form the NFC antenna, wherein the fourth conductive pattern is disposed parallel to the third conductive pattern on a side of the third conductive pattern on the same plane, wherein the third conductive pattern and the fourth conductive pattern are formed of a plurality of layers including a third layer and a fourth layer, and wherein in a third area where part of the third conductive pattern and part of the fourth conductive pattern intersect each other, the third conductive pattern does not include the third layer, and the fourth conductive pattern does not include the fourth layer.

14. The wireless charging antenna of claim 8, wherein the wireless charging antenna includes a wireless power coil (WPC).

* * * * *